United States Patent [19]

Dotts et al.

[11] 4,338,368
[45] Jul. 6, 1982

[54] ATTACHMENT SYSTEM FOR SILICA TILES

[76] Inventors: Alan M. Lovelace, Administrator of the National Aeronautics and Space Administration, with respect to an invention of Robert L. Dotts, Seabrook, Tex.; Jack W. Holt, Walnut, Calif.

[21] Appl. No.: 217,336

[22] Filed: Dec. 17, 1980

[51] Int. Cl.³ .................... B32B 5/14; B32B 5/26; B32B 7/02; B64C 1/38

[52] U.S. Cl. .................... 428/212; 156/329; 244/121; 244/158 A; 244/160; 244/163; 428/49; 428/218; 428/283; 428/289; 428/307.7; 428/311.5; 428/312.6; 428/317.9; 428/325; 428/446

[58] Field of Search ........... 428/49, 218, 310, 312, 428/317, 446, 699, 77, 78, 189, 190, 212, 234, 235, 241, 280–283, 288, 289, 307.7, 307.3, 310.5, 311.1, 311.5, 312.6, 312.2, 317.9, 325, 331, 447; 156/329; 244/121, 158, 160, 163

[56] References Cited

U.S. PATENT DOCUMENTS

| | | | |
|---|---|---|---|
| 2,460,309 | 2/1949 | Rapp | 428/49 |
| 2,754,224 | 7/1956 | Caroselli | 428/389 |
| 2,878,666 | 3/1959 | Drummond | 428/49 |
| 2,888,360 | 5/1959 | Sherts et al. | 428/312 |
| 3,494,782 | 2/1970 | Clark et al. | 428/323 |
| 3,920,339 | 11/1975 | Fletcher et al. | 428/77 |
| 3,952,083 | 4/1976 | Fletcher et al. | 264/63 |
| 4,093,771 | 6/1978 | Fletcher et al. | 428/312 |
| 4,104,426 | 8/1978 | Gonzalez | 428/288 |
| 4,124,732 | 11/1978 | Leger | 427/77 |
| 4,148,962 | 4/1979 | Frosch et al. | 428/366 |
| 4,151,800 | 5/1979 | Dotts et al. | 428/282 |
| 4,187,344 | 2/1980 | Fredriksson | 428/307.7 |
| 4,284,664 | 8/1981 | Rauch, Sr. | 427/180 |

Primary Examiner—William J. Van Balen
Attorney, Agent, or Firm—Russell E. Schlorff; John R. Manning; Marvin F. Matthews

[57] ABSTRACT

An improved method for markedly increasing the bond strength between a rigid, porous refractory material and a non-rigid substrate by densifying the face of the rigid material opposing the substrate. Densification is accomplished by wetting the refractory material and then impregnating it with a composite slurry having a particle size to fill voids of the porous material.

20 Claims, 3 Drawing Figures

ATTACHMENT SYSTEM FOR SILICA TILES

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; U.S.C. 2457).

TECHNICAL FIELD

The present invention relates to thermal insulation and, more particularly, to an improved means for attaching thermal insulating tiles to a structure.

Portions of the space shuttle orbiter, which are subject to temperatures between 700° to 2300° F. during re-entry, utilize insulating tiles for thermal protection. The tiles are formed of substantially chemically pure, silica fibers rigidized by a high purity silica binder which joins the fibers together at fiber crossovers. The tiles, known as L1-900 are manufactured by Lockheed Missiles & Space Co., Inc. Due to extremely high temperature resistance and low density, the tiles are most useful in thermal protection for a space vehicle where protection and weight are critical factors. However, due to the relatively low strength, rigidity, and extremely low coefficient of thermal expansion as compared to metals, the tiles must be secured to the structure by an attachment system which will minimize transfer of strains from the metal structure to the tile.

BACKGROUND ART

U.S. Pat. No. 4,124,732, incorporated herein by reference for all purposes, discloses the system utilized to attach the insulating tiles to the space shuttle orbiter. The tiles are isolated from the structure by an intermediate layer of fibrous material forming a strain isolation pad, the fibers of which yield to minimize the stresses which arise from expansion or contraction of the metallic structure and/or mechanical deflections. This strain isolation pad is formed of fibers of high temperature, stable material, which are closely arranged and randomly oriented and then needled to provide a felt-like configuration. The pad is attached to the tile and to the structure by thin layers of a high temperature, silicone adhesive.

It was recognized that the tiles would be subject to various loads during flight. The loads would be particularly high during launch when the tiles will be subject to high vibration, structural bending, and shock loads. Accordingly, tests were run to verify the strength of the system.

During flatwise tensile stress tests, it was found that there was an interfacial failure between the tile and strain isolation pad at low levels. The interfacial failure occurred at 6 psi whereas the predicated failure was at least 13 psi. Failure and consequent loss of tiles could result in a catastrophe since the tiles provide thermal protection to the shuttle during reentry.

Since interfacial failure at 6 psi was below the acceptable minimum, it could not be tolerated, and thought was given to returning to the method of installing tiles disclosed in U.S. Pat. No. 3,920,339. In such method the tile is bonded to a special rigid strain arrestor plate. While such method may be a viable solution if the structure to which the tile is to be attached is flat, it is almost unworkable where there is curvature, such as, in the case of an airframe.

It appeared that the interfacial failure was cased by uneven tension exerted by the strain isolation pad. One reason may be that individual vertically extending fibers were loading up first, resulting in excessive loading in small areas and eventual interfacial failure. Since this failure was occurring at a load less than the internal strength of the tile itself, it was felt that if the load could be transferred more uniformly into the tile material the system would be strengthened.

DISCLOSURE OF THE INVENTION

In accordance with the present invention, the face of the tile which opposes the strain isolation pad has been densified forming a high strength layer with plate stiffness and a smooth, homogenous surface. The result is that the load is shifted from the attachment surface fairly uniformly into the body of the material, and the system now withstands at least 13 psi of flatwise tensile stress.

One method of densifying the porous refractory tile is to wet the uncoated porous refractory material of uncoated face with a wetting agent, then impregnate the material with a slurry comprised of colloidal silica and fused silica slip, and then completely dry and re-waterproof the tile.

BEST MODE FOR CARRYING OUT THE INVENTION

Figure 1:
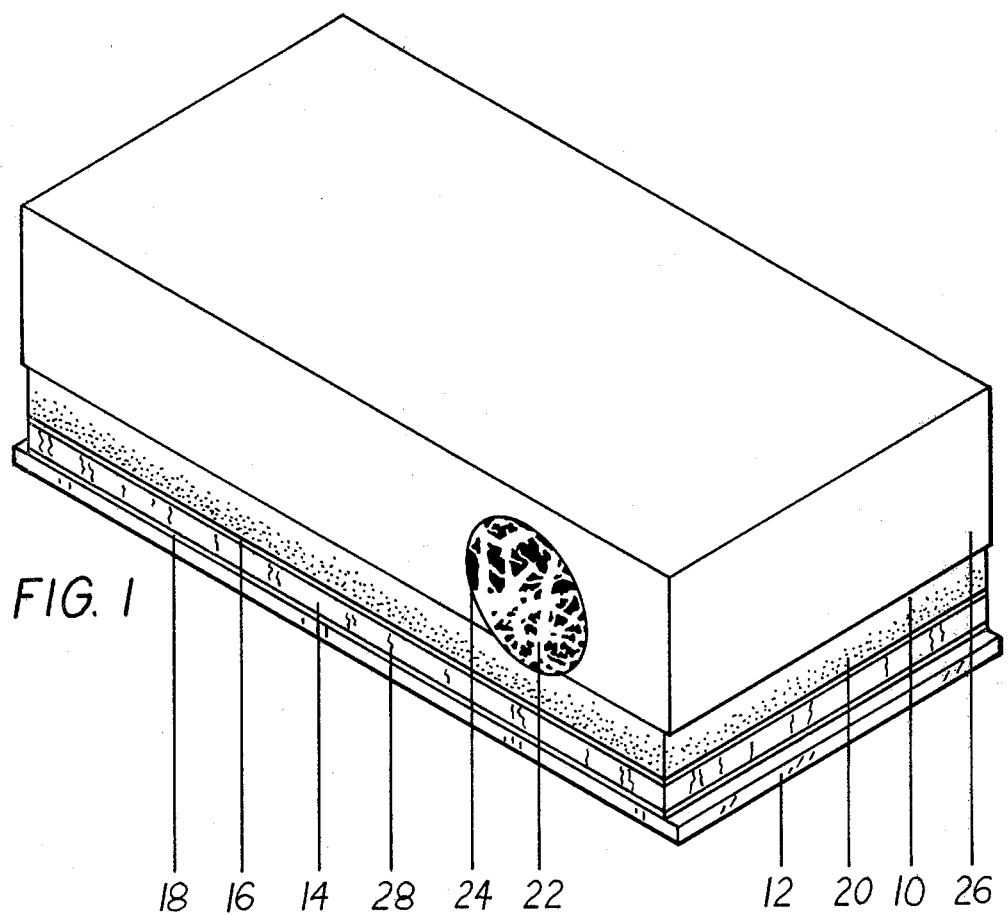
FIG. 1 is a pictorial view depicting the system of attaching silica insulating tiles to the structure of the space shuttle.

Referring to FIG. 1, the system for attaching a silica insulating tile 10 to the metallic structure 12 of a space shuttle orbiter is depicted. As can be seen, interposed between tile 10 and structure 12 is a strain isolation pad 14. Thin layers 16–18 of silicone bond attach the tile to the pad and the pad to the structure respectively. The difference between the system illustrated in FIG. 1 and that disclosed in U.S. Pat. No. 4,124,732 is that the face portion 20 of tile 10 which opposes strain isolation pad 14 has been densified.

Tile 10 is formed of 99.7% amorphous fibers—22—one to ten microns thick. See insert in FIG. 1. The fibers are rigidized into a solid block by ceramic bonding. For example, a slurry containing fibers mixed in water may be frame cast to form soft, porous blocks to which colloidal silica binder is added. When the porous blocks are sintered at 2400° F., a rigid block is produced which is cut and machined to the precise dimensions to form the individual tile 10. Ninety percent of tile 10 is formed of voids 24 and ten percent fibers 22, see FIG. 1 thereby permitting light weight tiles to be formed.

The tiles vary in thickness to minimize the weight and thermally protect the structure from seeing more than 350° F. The tiles provide adequate on-orbit space cold soak protection and must withstand repeated heating and cooling, plus extreme acoustic environments (165 decibels at launch) in some local areas. The resistance of L1-900 tiles to thermal shock is very good. For instance, the tile can be taken from a 1260° Celsius (2300° F.) oven and immersed in cold water without damage. Surface heat dissipates so quickly, an uncoated tile can be held by its edges with an ungloved hand seconds after removal from the oven and while the tile interior still glows red hot.

The tiles are provided with a coating 26 on the top and sides of various mixtures depending upon the properties desired. In addition, tile 10 is treated with a silicone resin after coating to provide waterproofing.

The strain isolation pad 14 is preferably formed of fibers of a material having thermal vacuum stability and stability in air within the intermediate temperature range of −250° F. to 550° F. The fibers are closely arranged and randomly oriented so that each fiber element will support the tile relatively independent of other fibers. Although fibers of various organic and inorganic based materials may be utilized in forming the strain isolation pad, it has been determined that aramid fibers sold by Dupont under the trademark NOMEX are particularly well suited. As reported in the Jan. 1977 issue of Textile Research Journal, pp. 62–66, NOMEX is poly (1,3-phenylene isophthalamide). The strain isolation pad is formed into a felt approximately 1.60 inches thick. One such felt, made by Globe-Albany, Inc., and known as Style No. 2544NRBZ is a needled, calendered, heat set and water proofed material. An isolation pad having a thickness of 0.160 inch is capable of deflecting approximately 0.010 inch under a tensile force of 5.3 psi., and has a tensile strength of at least 26 psi.

To make the strain isolation pad, two denier, 3 inch long fibers are loaded into a carding machine which untangles the clumps of fibers and "combs" them to make a tenous mass of lengthwise oriented relatively parallel fibers called a web. The crosslapped web is fed into a loom where it is lightly needled into a batt. Generally, two such batts are placed face to face where they are needled together to form felt. The felt is then subjected to a multi-needle-pass process until the desired strength is reached. The needled felt is then calendered to stabilize thickness approximately 0.40 centimeters (0.16 inches) by passing it through heated rollers at selected pressures. The calendered material is then heat-set at approximately 260° Celsius (500° F.) to thermally stabilize the felt. During the needling operation, some of the fibers end up extending vertically 28 in the completed structure.

In attaching the insulating tile to the shuttle, tile 10 is first bonded to strain isolation pad 14 and the assembly is then bonded to the aluminum skin 12 of the shuttle.

To attach tile 10 to pad 14 and pad 14 to the shuttle a thin layer (generally less than 10 mils) of silicone adhesive is utilized. It has been found that RTV 560, which is a methylphenl silicone adhesive manufactured by the General Electric Company is most satisfactory.

It was determined from material characterization tests that insulating tile 10 has a minimum tensile strength of 13 psi, strain isolation pad 14 has a minimum tensile strength of 26 psi and the RTV bond has a tensile strength of 400 psi. Yet when a flatwise tensile load was applied to the system, there was interfacial failure between the tile and pad at 6 psi.

Figure 2:
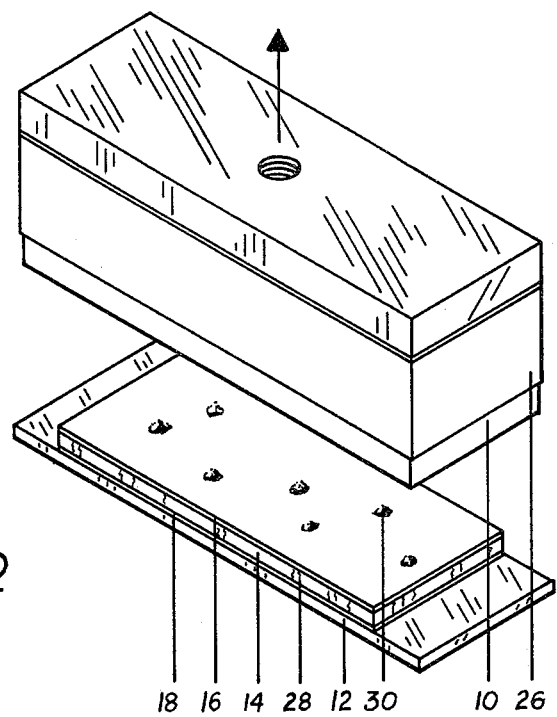
FIG. 2 is a pictorial view illustrating the prior art system after subjecting it to a flatwise tensile stress test.

As mentioned, during the needling process, some of the short fibers end up with a vertical orientation resulting in some regions of the strain isolation pad having higher stiffness than other regions. It is felt that such vertically oriented fibers 28 in strain isolation pad 14 cause uneven transmission of load into tile 10. If the tile fails locally at the stiff areas due to excessive loading, the failure will progress as the bonded area is incrementally reduced resulting in higher stresses. The areas adjacent to the local high stress points are then subjected to peel failure. The final result is interfacial failure. This can be seen in FIG. 2 where the numerous points 30 represent areas of tile 10 which are above the vertical extending fibers 28 of strain isolation pad 14. This was visually observed since the RTV layer was red and the tile was white. After failure, the red RTV layer was speckled with small areas of white tile material.

To overcome the premature failure, the present invention densifies the face of the tile opposing the strain isolation pad. The densification provides a high strength layer with plate stiffness and forms a smooth homogenous surface for the bond.

To densify a tile, the surface of the tile which is to be bonded to the strain isolator pad is pre-wetted with a wetting agent such as a $C_2$–$C_5$ alcohol, isoproponal being a preferred wetting agent, although ethanol, butanol, penanol, etc. can also be used. The wetting procedure is necessary since, as noted above, the tiles are waterproofed using silane during manufacture. The amount of the wetting agent applied to the surface of the tile will generally range from about 3 to about 5 grams of wetting agent per square inch of surface to be densified, preferably about 4 grams of wetting agent per square inch of surface to be densified. This is particularly true in the case where the wetting agent is isopropanol. The wetting agent is conveniently applied by brushing liberally and evenly over the tile surface until the required amount of wetting agent has been deposited. If desired, densification may be accomplished during manufacture, the wetting step eliminated.

Immediately after the wetting agent has been applied to the tile surface, the densifying slurry comprised of the colloidal silica and the fused silica slip is applied. The densifying slurry is comprised of an aqueous colloidal silica sol and a fused silica slip. The silica sol is commonly known as Ludox AS, sold by Dupont, contains approximately 30% by weight solids, is deionized and is adjusted to have a ph in the range of from about 8 to 9.5. The fused silica slip is a particulate silica in which the particles are irregularly shaped as opposed to being uniformly shaped such as for example spherical. It is an aggregate which is obtained by ball milling silica and acts as a reinforcement much in the nature that sand behaves as such in concrete. The colloidal silica, on the other hand, acts as a cement or bonding agent for the silica slip. The result is to provide a dense "pavement" surface layer on the tile. The slurry will generally contain from about 50 to about 55% by weight of the colloidal silica (Ludox) and from about 45 to about 50% by weight of the silica slip. Preferably, the slurry will have a density in the range of from about 1.36 to about 1.38 grams per milliliter.

Optionally, but preferably, the slurry contains a pigmenting agent which serves the purpose of indicating that a uniform layer of the densifying material has been deposited on the tile surface. Generally speaking the pigmenting agent will be present in an amount of from about 0.1 to about 1% by weight of the slurry. The pigment should, generally speaking, be inert and of a type which is resistant to high temperatures so as to not decompose under the extreme temperatures encountered in space flight. A pigment which has been found particularly useful in tetraboron silicide.

In the method of the present invention, the slurry is applied to the surface such as to provide an amount of from about 2 to about 4 grams of slurry per square inch of surface coated. Addition of the slurry to the wetted surface is carried out preferably by brushing the slurry onto the wetted surface, the object being to permit the slip particles to fill the intersticies of the tile surface. Generally speaking, the depth of densification of the tile by the slurry ranges from about 0.060 to about 0.11 inch. Desirably, sufficient slurry is applied so as to provide a densified layer, when dried, of approximately from about 0.3 to about 0.7 grams per square inch of surface, preferably about 0.5 grams per square inch of surface. The tile is next air dried for 24 hours followed by oven drying at approximately 150° F. for 2 hours. The dried tile is then waterproofed, preferably by a vapor deposition technique, to provide uniform waterproofing of the surface. While other waterproofing agents may be used, it has been found that a gaseous mixture comprised of vapors of methyltrimethoxysilane and acetic acid exposed to the densified surface of the tile at a temperature of around 350° F. provides excellent results. It was found that re-waterproofing the densified area prevented the Ludox from inhibiting the RTV bond. Following waterproofing, the tiles are heated in an oven to approximately 400° F. for a minimum of 2 hours. The tile is then ready for installation.

Figure 3:
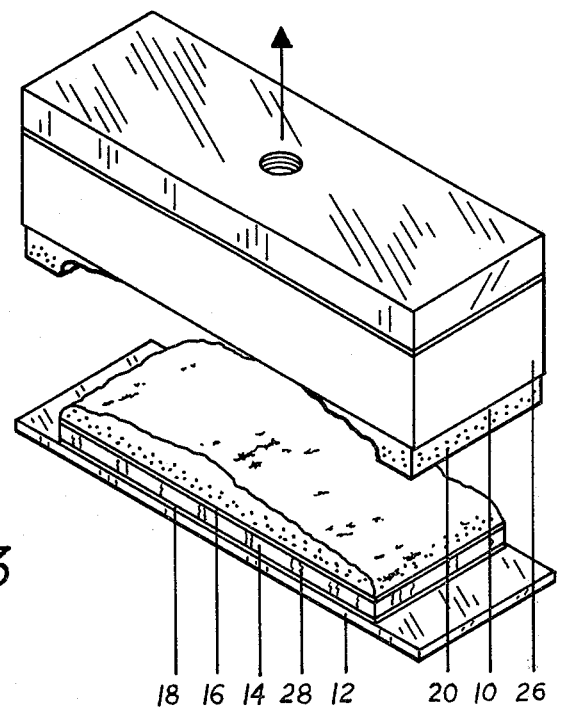
FIG. 3 is a pictorial view illustrating the system of the present invention after subjecting it to a similar test.

It has been found that tiles having a density of 9 pounds per cubic feet which failed interfacially at about 6 psi, after densification by the above described procedure, exhibit no significant interfacial failure due to flatwise tensile forces. Rather, the tile material itself fails internally of the tile body at a minimum tensile stress of 13 psi, see FIG. 3. Moreover, it has been found that the outer 0.35 inches of densified tile is 3 to 6 times as stiff and strong as the remainder of the tile. The net result is a reproducible shift of the locus of failure from the surface of the tile to the interior of the tile.

The foregoing process has been directed primarily to the densification of L1-900 tiles. However, it is equally applicable to tiles made in accordance with U.S. Pat. No. 3,952,083 and known as L1-2200 tiles and tiles made in accordance with U.S. Pat. No. 4,148,962 and known as FRCI tiles. The densification of the attaching face of porous ceramic tiles aids in providing a more bondable surface particularly where the substrate is itself not homogeneously smooth.

It will be apparent from the above description that the present invention provides a method whereby the bond strength between a rigid, porous refractory material and a non-rigid-substrate can be markedly increased by densifying the face of the material opposing the flexible substrate. A densification procedure involves impregnating the face of the material with a refractory material which may be the same or different, but which is compatible. The impregnation of the face, preferably with a slurry of a refractory having a particle size small enough to fill the intersticies or voids of the porous refractory material, can be accomplished to a depth sufficient to shift the failure due to flatwise tensile stresses from the interface between the refractory material and the non-rigid substrate into the body of the material itself.

The foregoing disclosure and description of the invention is illustrative and explanatory thereof, and various changes in the method steps may be made within the scope of the appended claims without departing from the spirit of the invention.

We claim:
1. The method of attaching rigid porous silica insulating tiles to the metallic structure of a multimission space vehicle, comprising: densifying the face portion of the tile opposing said structure to form a smooth homogenous surface, attaching the densified face of the tile to a strain isolation pad formed of aramid felt by a thin layer of high temperature silicone adhesive and attaching the strain isolation pad to the metallic structure by a thin layer of high temperature silicone adhesive.

2. The method of claim 1 comprising applying a wetting agent to said face portion, then applying a slurry comprised of collodial silica and fused silica slip to said wetted surface, drying said slurry and treating said face portion with a waterproofing agent.

3. The method of claim 2 wherein said wetting agent comprises isopropyl alcohol.

4. The method of claim 2 wherein said slurry contains a pigment.

5. The method of claim 4 wherein said pigment comprises tetraboron silicide.

6. The method of claim 2 wherein said drying is conducted at a temperature of around 150° F.

7. The method of claim 2 wherein said slurry comprises from about 50 to about 55% by weight of colloidal silica and from about 45 to about 50% by weight of silica slip.

8. The method of claim 2 wherein said slurry has a density in the range of from about 1.36 to about 1.38 grams per milliliter.

9. The method of claim 2 wherein said waterproofing is carried out by vapor deposition at a temperature of around 350° F.

10. The method of claim 2 wherein said waterproofing agent comprises a gaseous mixture of methyltrimethoxysilane and acetic acid.

11. The method of claim 4 wherein said arimid felt is comprised of flexible plastic fibers randomly oriented and closely arranged with respect to each other and then needled to form the felt configuration.

12. The method of claim 11 wherein said felt is approximately 0.160 inches thick, and deflects approximately 0.010 inches under a tensile force of about 5.3 psi with a tensile strength of substantially 26 psi.

13. The method of claim 1 comprising impregnating said face portion with a slurry of compatible refractory material having a particle size small enough to fill the intersticies of the face portion of the insulating tile.

14. A lightweight insulating tile for attachment to a flexible nonuniform substrate by a thin layer of silicone adhesive, said tile comprising: a rigid porous block of refractory material, the refractory material being primarily a mixture of substantially chemically pure silica fibers rigidized by a high purity silica binder, the face portion of the attachment surface being densified by impregnation of a compatible refractory material having a particle size small enough to fill the intersticies of the porous refractory material to provide a dense pavement for engagement of the silicone adhesive.

15. The insulating tile of claim 14 in which the densified portion is formed by applying an aqueous colloidal silica sol and a fused silica slip.

16. The insulating tile of claim 15 in which the tile is provided with a coating formed by the vapor deposition of methytremethoxysilane and acetic acid.

17. In an insulating system for a space vehicle formed of a plurality of insulating tiles of substantially chemically pure rigidized silica, the tiles attached to a metal substrate of the space vehicle, the tiles having a coefficient of thermal expansion markedly lower than the coefficient of the metal substrate, a strain isolation pad between each tile and the metal substrate, said pad attached to each tile and the metal substrate by a separate, layer of flexible adhesive bond, having a thickness less than 10 mils, each pad being formed of a plurality of high temperature resistant, flexible, plastic fibers randomly oriented and closely arranged with respect to each other to form a needled felt configuration isolating said tile from thermal and mechanical stresses generated by deformation of said metal substrate of the space vehicle, the improvement comprising: the face portion of the insulating tile opposing the strain isolation pad being densified to increase plate stiffness and distribute stresses into the body of the tile.

18. The insulating system of claim 17 wherein the face portion is impregnated with a compatible refractory material having a particle size small enough to fill the intersticies of the face portion.

19. The insulating system of claim 17 wherein the densification results from the application of a slurry comprised of collodial silica and fused silica slip to said face portion.

20. The insulating system of claim 19 wherein the face portion is treated with silane after densification.

* * * * *